United States Patent [19]
Sandolo

[11] Patent Number: 5,241,947
[45] Date of Patent: Sep. 7, 1993

[54] SIMULATED WOOD BURNING OVEN

[76] Inventor: Ralph Sandolo, 226 Thyar Pond Rd., Wilton, Conn. 06897

[21] Appl. No.: 895,121

[22] Filed: Jun. 8, 1992

[51] Int. Cl.⁵ .......................................... F24C 15/32
[52] U.S. Cl. ............................. 126/21 A; 126/273 R
[58] Field of Search ............. 126/21 A, 21 R, 273 R

[56] References Cited

U.S. PATENT DOCUMENTS

| | | | |
|---|---|---|---|
| Re. 26,063 | 7/1966 | Keating | 126/21 A |
| 3,417,742 | 12/1968 | Perl | 126/21 A |
| 4,109,636 | 8/1978 | Burge | 126/21 A |
| 4,793,322 | 12/1988 | Shimek et al. | 126/193 |

Primary Examiner—Carroll B. Dority
Attorney, Agent, or Firm—Arthur T. Fattibene; Paul A. Fattibene

[57] ABSTRACT

This disclosure is directed to a simulated wood burning oven which includes a housing having an oven spatially disposed therein to define a heated chamber around the oven. A burner is disposed within the heated chamber below the oven for generating products of combustion to heat the oven to baking temperatures. A secondary burner is disposed within the oven for producing a yellow flame to simulate a wood burning flame. Disposed adjacent to the access opening of the oven is a manifold having orifices through which air is directed under pressure to form a curtain of air across the access opening for retaining the heat within the oven during operation. Temperature regulating dampers are disposed adjacent the sides of the oven for controlling the baking or cooking temperatures within the oven.

8 Claims, 3 Drawing Sheets

SIMULATED WOOD BURNING OVEN

FIELD OF THE INVENTION

This invention is directed to a simulated wood burning oven which is gas fired for producing a pizza having the baked characteristic of a pizza produced in a wood burning oven.

PRIOR ART

Heretofore, the baking of a pizza in a wood burning oven imparted a particular baking characteristic to a pizza which is often preferred by pizza lovers. A pizza baked in an oven fired by burning wood would cause a baking characteristic which permits some baking to occur to the top of the pizza to result in a characteristic bubbling frequently preferred by pizza lovers. This baking characteristic resulted in a more crunchy or "well done" effect, which is not characteristic of a pizza baked in a conventional oven in which the heat is applied mainly to the bottom of the oven. However, wood burning ovens are relatively difficult to operate and require a constant supply of wood. Also, difficulty can be encountered in maintaining a uniform baking temperature. Ash disposal and cleaning is always a problem with such wood burning ovens.

Various types of heating ovens for cooking or baking a variety of different types of foods are known. Known patented ovens are disclosed in U.S. Pat. Nos. 4,976,253; 4,448,117; 4,095,586; 4,089,322; 4,076,008; 4,038,968; 2,836,696; 2,568,022; 2,480,951; 2,453,939; 2,350,067; 1,241,521 and 1,224,563. However, these known constructions are not deemed suitable for baking pizza having the baking characteristic of a wood fired pizza preferred by many pizza lovers.

SUMMARY OF THE INVENTION

According to this invention, the foregoing noted disadvantages of a wood fired pizza oven are obviated by a simulated wood burning oven which includes an oven chamber spatially disposed within an outer housing to define a heated air space about the oven chamber. Disposed in the space defining the burner chamber formed beneath the oven chamber is a burner for generating the heating products of combustion. Disposed within the oven chamber is a secondary burner arranged to operate with a yellow flame to simulate a burning wood flame to impart to the pizza the baking characteristic of a wood fired pizza oven. To control oven temperatures, the side walls of the oven chamber are provided with openings which communicate with the surrounding heated space. The oven side openings are valved between open and closed position by a sliding damper plate, which is also provided with corresponding openings arranged to move into and out of registry with the oven side wall openings as the damper plate is shifted to control the oven temperature accordingly. Adjacent the access opening to the oven chamber there is provided a manifold having a series of orifices through which forced air is directed to define a curtain of air across the access opening. The positive air pressure forming the air curtain serves to retain the oven heat within the oven chamber. The forced air introduced into the manifold may comprise heated air that is generated in the burner chamber and which is directed to the manifold under a positive pressure by means of a blower or fan.

IN THE DRAWINGS

DETAIL DESCRIPTION

Figure 1:
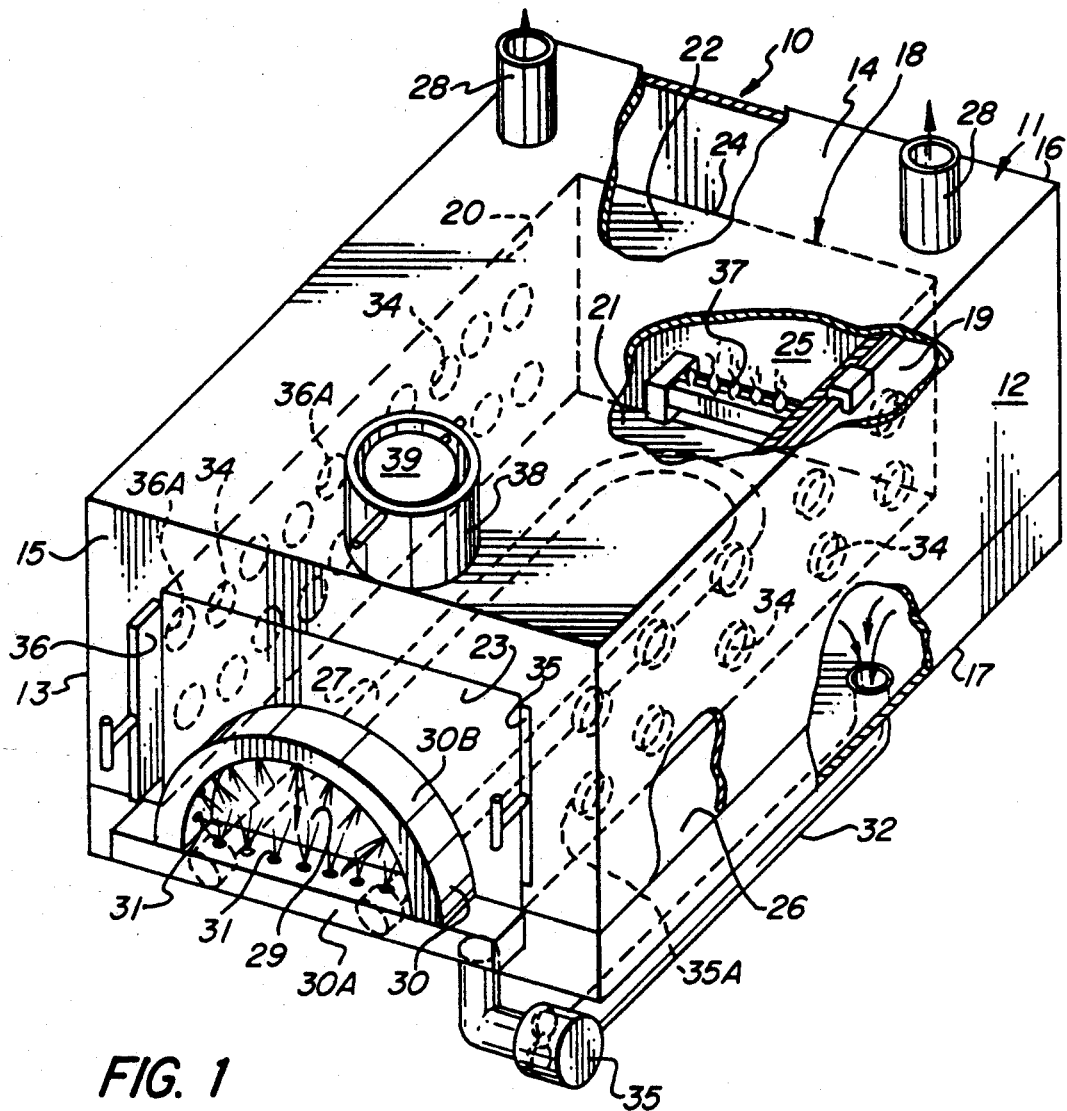
FIG. 1 is a perspective view of a simulated wood burning oven embodying the present invention having parts thereof broken away.

Referring to FIG. 1, there is illustrated a simulated wood burning oven 10 of the present invention which includes an outer housing 11 which is defined by opposed side walls 12 and 13, a top wall 14, a front and rear wall 15 and 16, and a bottom wall 17. Disposed in spaced relationship within the housing 11 is an oven 18 bounded by opposed oven side walls 19, 20, an oven bottom wall 21, an oven top wall 22, and an oven front wall 23 which may be coincidental to the housing front wall or may be a separate front wall spaced from the front wall 15 of the housing, and an oven rear wall 24. In the illustrated embodiment of FIG. 1, the front wall 15 of the housing 11 also defines the front wall 23 of the oven 18. The oven walls 19, 20, 21, 22, 23, and 24 define the oven chamber 25 in which the baking is performed. As described, it will be noted that the space defined between the walls of the housing 11 and the oven 18 form a heated space about the oven chamber 25. The space defined between the oven bottom wall 21 and the bottom wall 17 of the outer housing 11 forms a burner chamber 26 in which there is disposed a U-shaped gas burner 27. The burner 27 comprises the primary burner for generating the primary heat required for effecting the baking operation. In operation, the burner 27 generates the heating products of combustion which are circulated about the oven chamber for effecting the heating thereof, and which products of combustion are vented through vents 28-28 arranged to be connected to a suitable chimney for exhausting the heating combustion gases to the atmosphere.

Access to the oven chamber is effected by an opening 29 formed in the front wall 23 of the oven 18. In the illustrated embodiment of FIG. 1, the access opening 29 is shown as being semi-circular. Disposed about the access opening 29 is a manifold 30 arranged to circumscribe the opening 29. While the illustrated embodiment shows a manifold circumscribing the entire opening 29, it will be understood that the manifold may comprise solely of the horizontal portion 30A or the arcuate portion 30B. As shown, the respective portions 30A and/or 30B of the manifold are provided with a series of spaced orifices or nozzles 31 for directing forced air under pressure across the access opening 29.

In the illustrated embodiment, the forced air directed to the manifold 30 to define a curtain of air across the oven access opening 29 comprises the heated air or products of combustion generated in the burner chamber. As shown, a duct or conduit 32 connects the burner chamber 26 in communication with the manifold 30, and a suitable blower 32 is disposed in communication with the duct or conduit 32 to direct the heated air under a positive pressure to the manifold 30. The curtain of positive air pressure directed across the access opening 29 of the oven 18 thus functions to retain the heat, generated by the products of combustion, within the oven and thereby prevents heat loss. At the same time, the baker has unobstructive access to the oven chamber 25, which is desirable when the products, such as pizzas, are required to be placed into and out of the oven chamber frequently and quickly, e.g. in a high production environment of a busy pizza restaurant.

To control or regulate the oven or baking temperatures, the opposed side walls 19 and 20 of the oven are provided with a series of openings or holes 34 which communicate the oven chamber 25 with the surrounding heated space. Slidably disposed adjacent the respective oven side walls 19 and 20 are control damper plates 35A and 36A respectively. Each of the respective damper plates 35 and 36 are provided with a plurality of openings or holes 35A and 36A arranged to be moved into and out of registry with the corresponding oven side wall openings 34. As shown in FIG. 1, damper plate 35 is shown in its inward most position whereby the openings 35 are disposed in registration with the oven side wall openings 34 placing the oven chamber 25 in communication with the adjacent heating space. Damper plate 36 is illustrated in its protracted position whereby the damper openings 36A are disposed out of registry with the oven side wall openings 34, closing the oven chamber 25 from the adjacent heated space. Thus, by controlling the adjustment or position of the respective dampers 35, 36, the temperature within the oven chamber can be regulated accordingly.

In accordance with this invention, a secondary burner 37, preferably a gas burner, is disposed within the oven chamber 25 adjacent the rear wall 24. The burner 37 is provided with a fuel/air ratio which will permit the burner 37 to burn with a yellow flame to simulate a flame produced by burning wood. By locating the secondary burner 37 directly within the oven chamber, the flame produced thereby will permit baking to occur at the top of the pizza to result in a characteristic bubbling of the pizza commonly produced by a wood fired baked pizza. The baking characteristic results in a more crunchy or "well done" effect, which is not characteristic of a pizza baked in a conventional oven.

An oven vent 38 with a damper control 39 is provided for venting the oven.

While the oven chamber 25 is illustrated as being generally rectangular in cross-section, it will be understood that the top wall 14 may be vaulted or arched to enhance natural circulation of the heated air currents within the oven chamber 25. Also, it will be understood that the interior of the oven chamber 25 may be lined with fire brick.

Figure 2:
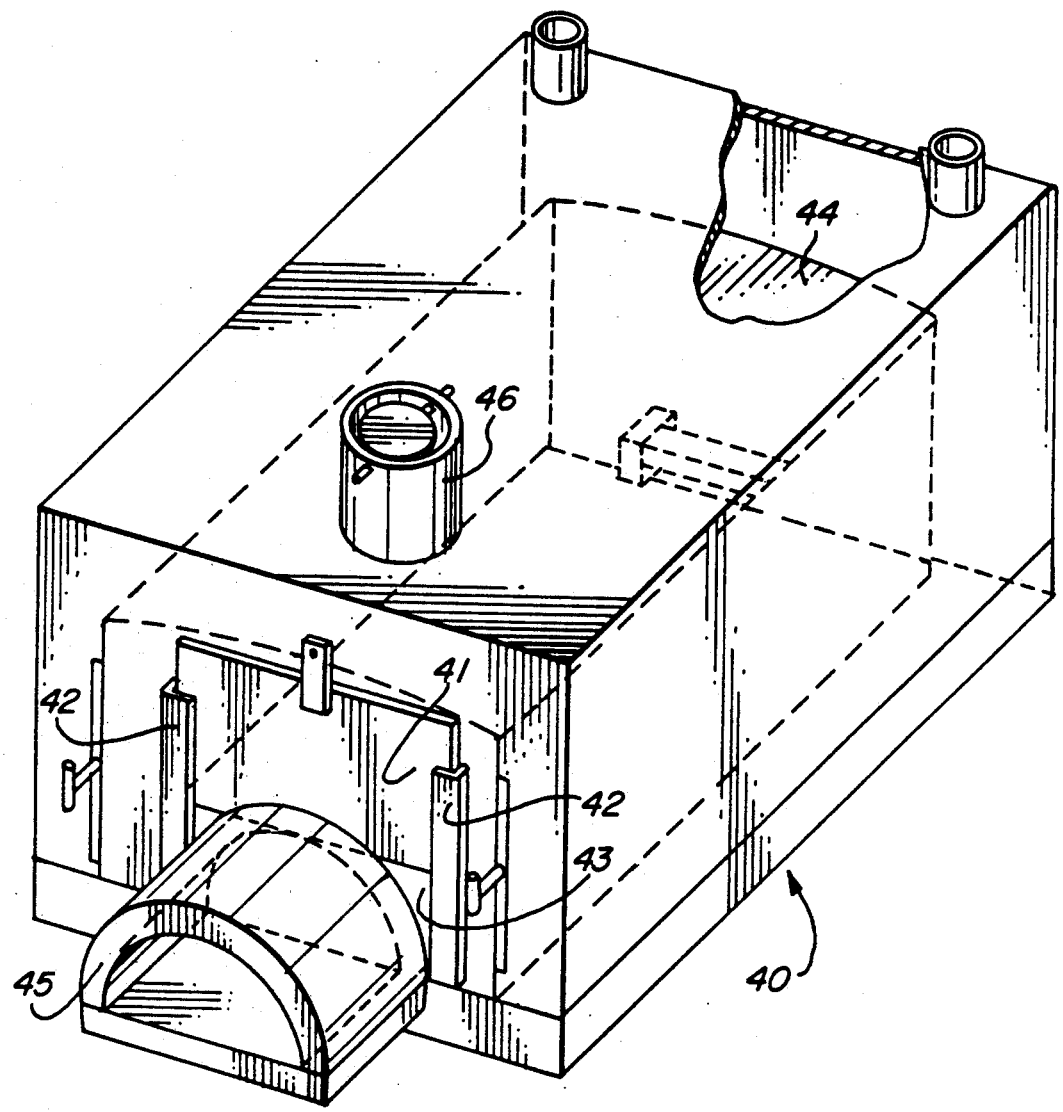
FIG. 2 is a perspective view of a slightly modified simulated wood burning oven of the present invention.

FIG. 2 illustrates a slightly modified pizza oven 40 embodying the invention. This embodiment differs from that described with respect to FIG. 1 by the inclusion of an access door 41 slidably disposed between a pair of slides 42—42 to define a closure for the access opening 43 to the oven chamber 44. As shown, access to the oven chamber 44 is achieved by raising the access door 41. If desired, the modified oven 40 is provided with a vestibule 45 projecting forwardly of the oven opening 43 and through which the goods or pizza to be baked are introduced into the oven chamber 40. The means for venting the oven chamber includes a vent 46.

In this form of the invention, the air curtain means, as hereinbefore described for sealing the access opening, is not required as a door closure 41 is provided. However, if desired, an air curtain means, as hereinbefore described and shown in FIG. 1, may be included as an option. In all other respects, the oven construction 40 of FIG. 2 is similar to that described with respect to FIG. 1.

Figure 3:
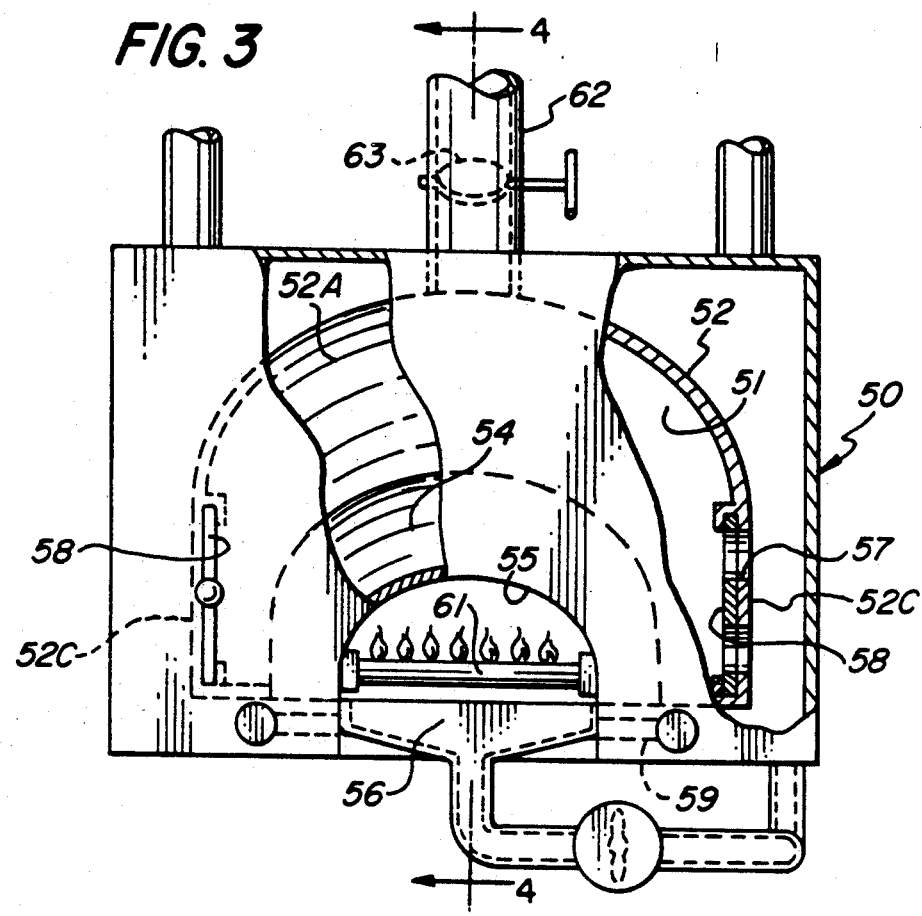
FIG. 3 is a front elevation view of another modified embodiment of the present invention.
Figure 4:
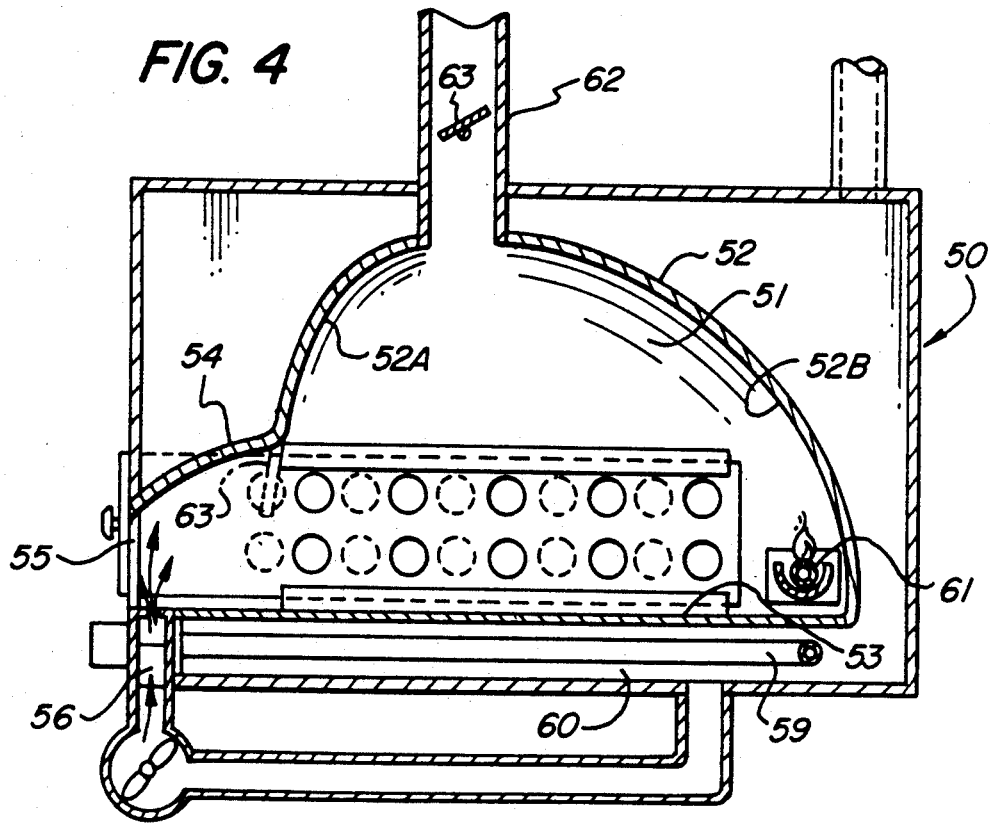
FIG. 4 is a section view of the embodiment of FIG. 3 taken along line 4—4 on FIG. 3.

FIGS. 3 and 4 illustrate a further modified oven construction 50. This form of the invention is similar to that described with respect to FIG. 1 with the exception that the shape of the oven chamber 51 has been modified. In this form of the invention, the roof or top wall 52 of the oven chamber is vaulted or curvilinear to define an arch which is shaped to define a front baffle wall portion 52A and defining a rear wall portion 52B which progressively slopes to meet the bottom wall 53 at the rear thereof. The front baffle wall portion 52A extends rather sharply to the top of the vestibule 54 which leads to the front access opening 55 to the oven chamber 51. In this form of the invention, the manifold 56 to produce the air curtain, as hereinbefore described, is located at the base of the front access opening 55. The opposed lower side wall portions 52C are provided with side openings 57 which are arranged to be valved between open and closed position by damper plates 58—58 in a manner as hereinbefore described with respect to FIG. 1. As described, the main burner 59 is disposed in the burner chamber 60 defined beneath the oven chamber 51, and the secondary burner 61 is disposed directly within the oven chamber 51 at the rear thereof. The oven chamber 51 is vented by an oven vent 62 which is controlled by damper 63. In this form of the invention, the front baffle wall 52A is shaped and designed to function as a means to assist in retaining the heat in the oven whereby the heated air, which normally tends to rise, can be confined within the upper domed or arched portion of the oven. Thus, the hottest heating gases can be confined to the upper part of the oven permitting cooking on the top of the pizza. If desired, the front baffle wall portion 52A can be extended downwardly into the vestibule area as indicated by the extended dotted line showing as indicated at 63 to extend the confined area of the heating air at the top of the oven chamber 51. In all other respects, the construction and operation of the oven construction 50 is similar to that described with respect to FIG. 1.

While the invention has been described with respect to several embodiments, it will be appreciated and understood that variations and modifications may be made without departing from the spirit or scope of the invention.

What is claimed is:

1. A simulated wood burning pizza oven comprising:
   an outer housing,
   an oven spatially disposed within said housing,
   said oven having a front access opening,
   a burner chamber formed between a bottom of said oven and said housing,
   a burner disposed within said burner chamber,
   means for venting said burner chamber,
   and a secondary burner disposed within said oven operating with an air/fuel ratio for producing a yellow flame to simulate a wood burning flame,
   wherein said secondary burner comprises a gas burner operating with an air/gas mixture for producing a yellow flame,
   said housing includes a pair of opposed housing side walls, and
   said oven having opposed oven side walls spaced from the corresponding housing side walls, said oven side walls having a plurality of openings in communication with the space defined between said housing and oven side walls, and damper plates slidably disposed adjacent said oven side walls for valving said oven side wall openings between open and closed position to regulate the temperature within said oven, wherein said damper plates having a plurality of holes arranged to shift into and out of registry with said corresponding oven side wall openings as said damper plates are adjusted to control oven temperature.

2. A simulated wood burning pizza oven comprising:
an outer housing,
an oven spatially disposed within said housing,
said oven having a front access opening,
a burner chamber formed between a bottom of said oven and said housing,
a burner disposed within said burner chamber,
means for venting said burner chamber,
and a secondary burner disposed within said oven operating with an air/fuel ratio for producing a yellow flame to simulate a wood burning flame,
an including a manifold disposed adjacent said access opening,
said manifold having a plurality of orifices formed therein,
and means for introducing forced air into said manifold and through said orifices,
said orifices being directed to define a curtain of air across said access opening when forced air is introduced into said manifold to retain the heated air within said oven chamber.

3. A similar wood burning pizza oven as defined in claim 2 wherein said means for introducing air to said manifold comprises a hot air outlet disposed in communication with said burner chamber, and
a hot air inlet in communication with said manifold,
conduit means connected between said outlet and inlet,
and a blower means connected to said conduit means for directing hot air from said burner chamber to said manifold.

4. A simulated wood burning pizza oven comprising:
a housing having opposed side walls, bottom wall, top wall, and rear wall,
an oven spatially disposed within said housing,
said oven having a front access opening, opposed side walls, bottom wall, top wall, and real wall spaced from the corresponding side walls, bottom wall, top wall and real wall of aid housing whereby the space between said oven bottom wall and housing bottom wall defines a burner chamber,
a gas burner disposed in said burner chamber,
a secondary gas burner disposed in said oven adjacent said rear wall of said oven,
said secondary gas burner being adapted to operate with an air/gas ratio to produce a yellow flame simulating a wood burning flame,
said side walls of said oven having a plurality of openings disposed in communication with the space between said housing and corresponding side walls of said oven,
sliding damper plates disposed adjacent each of said oven side walls for valving said oven side wall openings for controlling the temperature within said oven, said damper plates having a series of openings therein arranged to shift into and out of registry with said openings of said oven side walls between an open and closed position, means for venting the space between said housing and said oven, means defining a manifold disposed adjacent said front opening, said manifold having a plurality of spaced openings for directing a curtain of heated air across said front opening for retaining the heat generated by said burners within said oven, circulating means for circulating heated air through said manifold, said circulating means including a conduit connecting said burner chamber in communication with said manifold, a blower for directing heated air from said burner chamber to said manifold.

5. A simulated wood burning pizza oven as defined in claim 4 and including an oven vent, and a damper for said oven vent.

6. A simulated wood burning pizza oven comprising:
a housing
an oven spatially disposed within said housing to define a space therebetween,
means defining an access opening to said oven,
a burner disposed within said space to generate heat within said space for indirectly heating said oven,
means for venting said space,
a burner disposed within said space to generate heat within said space for indirectly heating said oven,
means for venting said space,
said oven having an arched dome having a front portion thereof defining a baffle wall disposed above said access opening,
a manifold having a series of orifices therein disposed adjacent said access opening,
means for connecting said space in communication with said manifold,
means for directing heated air from said space to said manifold to produce a curtain of heated air across said access opening,
and a secondary burner means disposed within said oven to simulate a wood burning flame.

7. A simulated wood burning pizza oven as defined in claim 6 and including means for regulating the oven temperature.

8. A simulated wood burning pizza oven comprising:
an outer housing,
an oven having opposed side walls, bottom wall and rear wall spatially disposed within said housing,
said oven having a front access opening,
means disposed adjacent said front opening to form a curtain of air across said opening,
a burner chamber formed between a bottom of said oven and said housing,
a burner disposed within said burner chamber,
means for venting said burner chamber,
and a secondary gas burner disposed within said oven adjacent said rear wall, said secondary gas burner operating with an air/fuel ratio for producing a yellow flame to simulate a wood burning flame.

* * * * *